(12) United States Patent
Kühne

(10) Patent No.: US 11,118,991 B2
(45) Date of Patent: Sep. 14, 2021

(54) MEMS DEVICE USING A RELEASED DEVICE LAYER AS MEMBRANE

(71) Applicant: ETH Zurich, Zurich (CH)

(72) Inventor: Stéphane Kühne, Zurich (CH)

(73) Assignee: ETH Zurich, Zurich (CH)

( * ) Notice: Subject to any disclaimer, the term of this patent is extended or adjusted under 35 U.S.C. 154(b) by 424 days.

(21) Appl. No.: 16/080,500

(22) PCT Filed: Feb. 27, 2017

(86) PCT No.: PCT/EP2017/054472
§ 371 (c)(1),
(2) Date: Aug. 28, 2018

(87) PCT Pub. No.: WO2017/148847
PCT Pub. Date: Sep. 8, 2017

(65) Prior Publication Data
US 2019/0064021 A1    Feb. 28, 2019

(30) Foreign Application Priority Data
Feb. 29, 2016  (EP) .................................... 16157829

(51) Int. Cl.
*G01L 9/00*    (2006.01)
(52) U.S. Cl.
CPC .......... *G01L 9/0073* (2013.01); *G01L 9/0016* (2013.01); *G01L 9/0047* (2013.01)
(58) Field of Classification Search
CPC .... G01L 9/0073; G01L 9/0016; G01L 9/0047
See application file for complete search history.

(56) References Cited

U.S. PATENT DOCUMENTS 5,528,939 A    6/1996  Martin et al.
5,591,679 A    1/1997  Jakobsen et al.
(Continued)

FOREIGN PATENT DOCUMENTS

DE    4300893 A1    7/1994
EP    2309241 A1    4/2011
(Continued)

OTHER PUBLICATIONS

De Graaf, Ger, et al., "Bulk Micromachined Electrostatic RMS-to-DC Converter", IEEE Transactions on Instrumentation and Measurement, vol. 50, Issue 6, Dec. 2001, pp. 1508-1512.
(Continued)

*Primary Examiner* — Jamel E Williams
(74) *Attorney, Agent, or Firm* — Murphy, Bilak & Homiller, PLLC

(57) ABSTRACT

The present invention provides a pressure transducer (1) and a method for fabricating a pressure transducer. The pressure transducer is for use in a gas pressure gauge and uses a squeeze-film. The pressure transducer comprises a first wafer (2) and a second wafer (3), wherein—at least the first wafer comprises a device layer (2.1) and a handle layer (2.3); —the second wafer (3) has a top and bottom surface; and wherein—at least the device layer (2.1) of the first wafer (2) is structured. The pressure transducer further comprises a membrane (4.1), a cavity (5) between the membrane (4.1) and the second wafer (3), wherein the cavity (5) has a cavity bottom, an inlet (12) connecting the cavity (5) to a surrounding, a suspension (6) of the membrane (4.1), wherein the suspension (6) allows oscillation of the membrane (4.1), and an oscillation generator to set the membrane (4.1) in oscillation. The pressure transducer is characterized in that the structured device layer (2.1) of the first wafer (2) comprises the membrane (4.1) and suspension (6) of the membrane
(Continued)

Figure 1A:
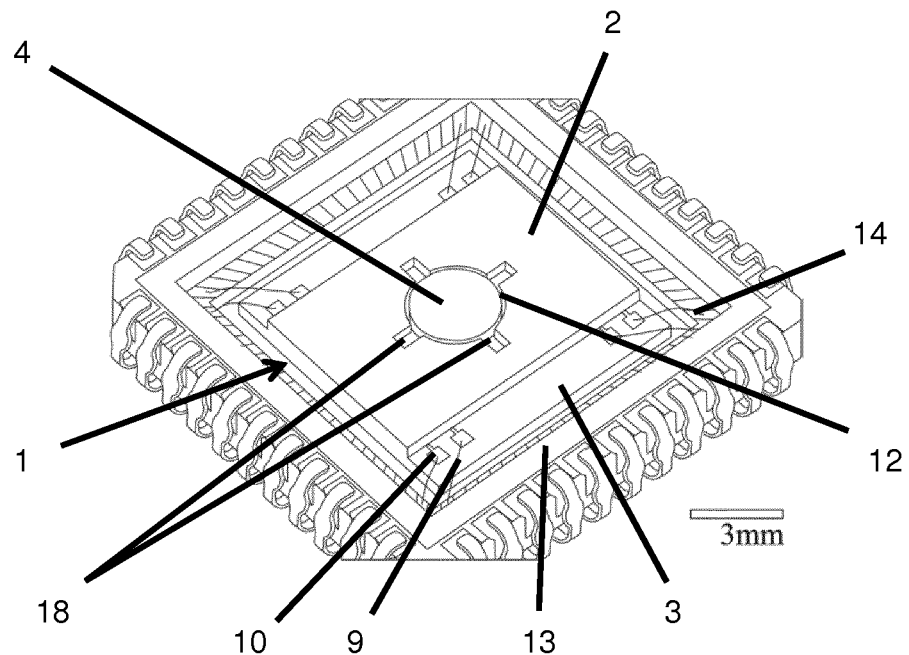

(4.1), in that the first wafer (2) is bonded to the top surface of the second wafer (3), and in that the handle layer (2.3) of the first wafer (2) is structured to release the suspension (6).

21 Claims, 4 Drawing Sheets

(56) References Cited

U.S. PATENT DOCUMENTS

| | | |
|---|---|---|
| 5,939,635 A | 8/1999 | Martin |
| 8,516,905 B2 * | 8/2013 | Nakamura ............ G01L 9/0019 |
| | | 73/862.59 |
| 2004/0250625 A1 | 12/2004 | Kogan et al. |
| 2008/0053236 A1 | 3/2008 | Gogoi et al. |
| 2013/0193529 A1 | 8/2013 | Burchard |
| 2015/0145374 A1 | 5/2015 | Xu et al. |

FOREIGN PATENT DOCUMENTS

| | | | |
|---|---|---|---|
| WO | 9318381 A1 | 9/1993 | |
| WO | WO-9318381 A1 * | 9/1993 | ............. G01N 11/04 |

OTHER PUBLICATIONS

Schwarz, P., et al., "Vacuum Pressure and Gas Detection with a Silicon Based Micromechanical Squeeze Film Sensor", Procedia Engineering, vol. 5, 2010, pp. 750-753.

Tenholte, D., et al., "A MEMS friction vacuum gauge suitable for high temperature environment", Sensors and Actuators A: Physical, vol. 142, Issue 1, 2008, pp. 166-172.

* cited by examiner

MEMS DEVICE USING A RELEASED DEVICE LAYER AS MEMBRANE

The invention is in the field of microelectromechanical systems (MEMS). It relates to a device that comprises an oscillating or otherwise movable element, such as a resonator element. More in particular, it relates to a pressure transducer of a vacuum pressure gauge that comprises such an element. The invention also relates to a fabrication method to fabricate such a pressure transducer and such an element.

Microelectromechanical systems are routinely used in many devices that combine mechanical and electronic functionalities on a size scale in the range of a few micrometers to a few millimetres. Some examples of the broad applications field of MEMS devices are sensors, actuators, oscillators and applications in the field of microfluidics.

Pressure gauges are a key element in operating and controlling modern vacuum systems. Such systems are of highest importance in a variety of industries, such as the coating-, automotive-, optical- and semiconductor industry, or in the production of solar cells and medical devices. In all these industries, a reliable measurement of the pressure within a vacuum chamber is mandatory in order to monitor or control process steps that have to be carried out under reduced pressure.

Nowadays, there are various pressure gauges available that differ in their basic measurement principle, the addressed pressure range, their handling, and their reliability. The most popular pressure gauges and their limitations are:

- Convection gauges ("Pirani gauges"): appropriate for the pressure range between $10^2$ and $10^{-5}$ mbar, strong gas-type dependence and non-linear behaviour;
- Cold cathode gauges ("Penning gauges", inverted magnetron): appropriate for the pressure range between $10^{-3}$ and $10^{-9}$ mbar, moderate accuracy (~30%) and repeatability (~5%), drawback of self-sputtering and contamination, potential time loss due to ignition delays;
- Hot cathode gauges ("Bayard-Alpert gauge"): appropriate for the pressure range between $10^{-4}$ and $10^{-10}$ mbar, moderate accuracy (~15%), drawback of contamination and failure by operation outside specified range, potential time loss due to needed cooling down before exposure to air.
- Pressure gauges based on a diaphragm: appropriate down to $10^{-2}$ mbar, measurement range limited to 4 decades of pressure and decreasing accuracy with decreasing pressure.

As this short list shows, the presently used pressure gauges show remarkable potential for improvements in terms of accuracy and repeatability, reliability and time to failure, addressed pressure range, size, and gas-type dependence. This potential for improvements can at least partly be realized by MEMS pressure gauges, for example by gauges that comprise a suspended resonator in combination with a friction/squeeze-film, below referred to as "squeeze-film".

The novel approach for pressure gauges based on a squeeze-film has been discussed mainly in non-patent literature and from a conceptual point of view, for example in D. Tenholte et al., Sensors and Actuators A: Physical, vol. 142, pp. 166-172 (2007) or in P. Schwarz et al., Procedia Engineering, vol. 5, pp. 750-753 (2010). In patent literature, there are only few documents related to a friction/squeeze-film type microelectromechanical system, e.g. EP 2 309 241 A1, DE 43 00 893 A1 and U.S. Pat. No. 5,939,635. In all these documents, important aspects with respect to a commercialization of a friction/squeeze-film type microelectromechanical system, such as sensitivity range, reproducibility, stability, reliability, but also stability and simplicity of the fabrication process, have not been considered yet.

MEMS pressure gauges not relying on a squeeze-film are shown in US 2008/053236 A1 and in U.S. Pat. No. 5,591,679 A, for example. US 2008/053236 A1 discloses a capacitive pressure sensor comprising a pressure-sensing diaphragm that is mechanically coupled but electrically insulated from a mechanical capacitor that generates the electrical output of the sensor. This is done by the use of a sealed cavity which prevents the use of a squeeze-film as sensing mechanism. Similarly, U.S. Pat. No. 5,591,679 A shows a method for fabricating sealed cavities for multiple types of devices such as pressure sensors which include reference volumes and force sensors.

Different obstacles need to be overcome in order to realize a reliable pressure gauge that is based on a squeeze-film and that shows a large measurement range. The characteristics and reliability of all MEMS device comprising small sized components depend strongly on size variations in the micrometer regime. This leads to high demands concerning device layout and fabrication process. In the case of a squeeze-film type pressure gauge, the interaction of the sensing element with the gas molecules, in particular the gas molecules forming the squeeze-film, needs to be optimized. This can be done by a resonantly oscillating membrane being at a well-defined distance in the range of a few micrometers to a substrate and extending over a large area parallel to the substrate, i.e. by forming a cavity having an aspect ratio between an extension of the membrane parallel to the substrate and the distance of the membrane to the substrate of more than 100, for example.

However, existing MEMS fabrication processes and device layouts do not allow the production of such a membrane and related parts needed to produce a pressure transducer with the reproducibility and reliability needed for a device commercialization. This also includes that the membrane and its suspension should not comprise any undesired additional structures. Such undesired structures may result from an inappropriate fabrication process (e.g. etching holes needed in order to release a large membrane).

Further, the membrane needs to show appropriate resonance modes which can be achieved by loading the membrane with a suitable mass. Preferably, this is done in a process step that is easy to integrate in the overall fabrication process of the pressure gauge or its pressure transducer and that allows for an easy adaption of the mass.

It is an object of the present invention to provide a friction/squeeze-film type pressure transducer that outperforms state-of-the-art pressure transducers, for example in terms of the reproducibility of its characteristics, its measurement range or its accuracy.

It is further an object of the invention to provide a membrane that is loaded or unloaded by a mass, e.g. for use in a friction/squeeze-film type pressure transducer, wherein the membrane outperforms state-of-the-art membranes in terms of the reproducibility of its characteristics.

It is further an object of the present invention to provide a pressure transducer based on a friction/squeeze-film for use in a pressure gauge with improved accuracy, repeatability, reliability, measurement range, compactness, and gas-type dependence compared to state-of-the-art pressure transducers.

It is further an object of the invention to provide a simple, cost-efficient and potentially high-yield fabrication process for said pressure transducer and said membrane.

These and further objects are achieved by the invention as defined in the claims and the description.

The pressure transducer according to an aspect of the invention is a friction/squeeze-film gauge type sensor element, wherein the measurement method is based on the influence of ambient pressure on the system properties (such as resonance frequency, Q-factor) of a micro-resonator. In this, an appropriately designed cavity gives the space required for an oscillation of a resonator or resonator element comprising a membrane that is possibly loaded by a mass and the oscillation properties of the resonator or resonator element are indicative of the pressure. In the following, resonator and resonator element are used as synonyms. The cavity, especially in the form of a thin gas film cavity, forms a gap near the resonator and causes pressure dependent squeeze-film damping of the resonator, so that the measured system properties are indicative of the pressure.

Due to the confinement of the interaction region between the resonator and gas in the cavity, in particular a cavity with a high aspect ratio given by the extension of the membrane parallel to the substrate and a narrow gap, the limited interaction at high vacuum and the resulting necessary long measurement times are overcome, so that the pressure transducer is suitable for a large measurement range.

For example, aspect ratios in the order of 100 up to 10,000, especially between 500 and 5,000 and between 1000 and 5,000 lead to an interaction of the membrane with the gas molecules that is favourable for pressure sensing in the vacuum range.

The sensing sensitivity in a given pressure range is linked with the aspect ratio. Hence, the aspect ratio that is favourable for a specific pressure range depends on said specific pressure range. In other words, one can envisage to use a specific aspect ratio in order to optimize the pressure gauge for a pressure range that expands over a smaller or larger pressure range and/or that is located around another (pressure) working point, for example.

In accordance with the mentioned aspect of the invention, the pressure transducer based on a squeeze-film comprises a first wafer and a second wafer, wherein at least the first wafer comprises a device layer and a handle layer, and wherein the second wafer contains a top surface and a bottom surface. The top surface is the surface of the second wafer that is in operation of the pressure transducer closer to the first wafer than its bottom surface.

In particular, the second wafer is a crystalline or polycrystalline Si-wafer, a SOI-wafer or a CMOS wafer. However, it can also be made of a material different to Si, e.g. of glass.

At least the device layer of the first wafer is structured.

The pressure transducer further comprises a membrane, a cavity between the membrane and a portion of the second wafer, wherein the cavity has a cavity bottom and side walls, an inlet connecting the cavity to a surrounding, a suspension of the membrane that allows oscillation of the membrane, and means to set the membrane in oscillation, i.e. an oscillation generator that may be part of a circuitry.

The pressure transducer may further comprise a mass that loads the membrane.

An extension of the cavity along an axis perpendicular to the large surface of the membrane ("vertical" extension) may be small, so that the cavity is a small gap only. For example, this extension may be less than 20 µm, especially less than 10 µm or at most 5 µm and at least 0.7 µm or at least 1 µm.

The inlet connects the cavity to the surrounding atmosphere and ensures that a pressure equalization between surrounding area and cavity takes place. In an embodiment of the pressure transducer, the inlet is an opening through the whole first wafer, wherein the opening separates the membrane (and mass, if present) from the rest of the first wafer. This means that the inlet is in particular a gap that surrounds the membrane except in the region of the suspension. The distance between two points on opposite sides of the gap is for example larger than 10 µm, in particular larger than 100 µm and may be smaller than 1 mm, especially smaller than 500 µm.

In other embodiments, the inlet may be formed by channels in the device layer or the handle layer or both layers of the first wafer; such an inlet from the side is especially suitable when applying a cap on top of the resonator element.

In yet other embodiments, the inlet may be formed by corresponding channels in the second wafer as well.

The membrane forms part of the resonator by being capable of being set in oscillation. In embodiments, the membrane has a round shape and hence is disk-like. In these embodiments, the diameter of the disk-like membrane is between 100 µm and 10 mm, especially between 200 µm and 5 mm and between 500 µm and 5 mm.

However, embodiments with a membrane of arbitrary shape as well as membranes of for example rectangular or elliptical shape are possible.

The structured device layer of the first wafer comprises the membrane and its suspension. In dependence of the structuring process used, membrane and suspension may be covered by portions of an etch stop (see below).

In particular, the thickness of the membrane and the suspension is identical or at least identical within a few nanometer to the original thickness of the device layer.

The first wafer is bonded to the top surface of the second wafer.

In particular, the first wafer is bonded along its structured device layer to the top surface of the second wafer.

Further, the structure of the handle layer of the first wafer is such that it releases the suspension, possibly forms the inlet, and releases in consequence also the membrane and the mass, if any present. In this context, "release" has the meaning of detaching the said element from unwanted connections to its surroundings.

In embodiments, the handle layer side of the first wafer is not structured as long as the first wafer is a detached (still separate) element but is only structured when the first wafer is bonded to the second wafer. Although this is an especially suitable embodiment, it is also possible to partly or fully structure the handle layer of the first wafer before bonding to the second wafer.

Further, the structure of the handle layer of the first wafer may be a local through-etching of the handle layer and the etch stop (if present e.g. as a layer), in order to release structures of its device layer, for example.

In an embodiment, the first wafer is processible by depth controlled etching. Depth controlled etching can be realized by controlling the etching time (time controlled etching) or by the use of an etch stop, for example.

The etch stop can be a change of etch properties of the substrate material, e.g. silicon, gallium nitride, dielectric layers or by changing the doping level of the base substrate. If the etch stop is e.g. as a layer, its thickness is preferably such that it has no effect on the characteristics of the resonator. In particular, its thickness is small compared to the thickness of the device layer and the thickness of the handle layer. In addition or alternatively, its thickness is highly uniform over a first wafer and over different first wafers.

In this embodiment, an etching depth of the depth controlled etching corresponds to a thickness of the device layer of the first wafer. Hence, this depth may define the device layer, which means that it may be defined by the depth of the structures produced by depth controlled etching. This depth may further define both device layer and handle layer of the first wafer by being the depth at which the handle layer ends and the device layer begins. In particular, it may define device layer and handle layer without the presence of another, e.g. separating, layer.

In another embodiment, the first wafer comprises an etch stop which defines the device layer and the handle layer of the first wafer by being a boundary between device layer and handle layer.

In particular, the etch stop is designed to allow structuring of the first wafer in a two-step process, wherein the first step structures a first portion of the first wafer and the second step structures a second portion of the first wafer. In this case, the device layer is or comprises said first portion and the handle layer is or comprises said second portion.

The etch stop may be a layer, especially a layer of the above-described kind, that separates handle and device layer.

In an embodiment the first wafer is a silicon-on-isolator (SOI) wafer comprising a device layer made of undoped or doped Silicon (Si), an oxide layer, and a handle layer made of Silicon. In this embodiment, the etch stop is formed by the oxide layer.

In the following, the intuitive embodiment comprising a SOI wafer as first wafer is often used to describe the invention. However, neither the invention nor embodiments of the invention nor related fabrication processes are restricted to said SOI wafer and/or an etch stop formed by an oxide layer.

In an embodiment of the pressure transducer, the top surface of the second wafer is structured, as well. In particular, the top surface is structured before the first wafer is bonded to the top surface of the second wafer.

An example of a structure of the top surface of the second wafer is the cavity that may be defined by etching a recess into said top surface. However, the cavity may also be formed by a recess in the device layer of the first wafer. In accordance to the aspect of the invention to fabricate a well-defined gap between resonator and boundary, the deposition and structuring of layers (spacer layer) onto the device layer of the first wafer or onto the surface of the second wafer are also possible in order to form the cavity.

Therefore, at least the first wafer or the first and the second wafer each comprise a structured surface.

The invention is based on the finding that a MEMS device, in particular a pressure transducer, comprising a membrane that is capable to oscillate and that is located for example only a few micrometers over a base as well as a suspension which holds the membrane can be reliably fabricated if the following conditions are fulfilled:

The structure fabricated by micro-fabrication methods into the device layer side of a first wafer, in particular a SOI-wafer, contains the not yet released suspension. The suspension is designed to hold a portion of the first wafer, wherein this portion is the later membrane;

The structure or—more general—spacer layer fabricated by micro-fabrication methods onto or into the device layer of the first wafer or into or onto the second wafer defines a recess having a depth adapted to the target distance in the micrometer range between membrane and a base;

The first wafer is bonded with its structured surface to the possibly structured surface of the second wafer resulting in a cavity formed by the membrane and the bottom and side walls of the cavity; and Suspension and membrane are released after said bonding by treating the handle layer of the first wafer. This treatment also leads to an inlet into the said cavity.

It has been found that the fabrication tolerances, reliability and yield of a pressure transducer according to the invention are superior to pressure transducers based on a method wherein both the handle and the device layer are manufactured from the same side and after bonding to the second wafer, e.g. by a double etch step where the device layer structure is first etched through the handle layer and into the buried oxide and thereafter the release and removing of the handle layer on top of the suspension is carried out in a second etch step.

It has also been found that this roadmap to a MEMS device, in particular a pressure transducer, comprising a membrane, can easily be extended in order to integrate additional elements such as an adjustable mass, electrodes or areas for electric contacts.

It has further been found that the reproducibility of major parts of MEMS devices in terms of their dimensions and physical properties can be substantially increased if the highly uniform thickness (variations in the nanometer range) of the device layer, that is for example defined by an etch stop of the kind described above, is used. A good example thereof is the SOI-wafer. Thanks to the use of SOI-wafers in the semiconductor industry and the related requirements and manufacturing tolerances of SOI-wafers, the device layer thickness is not only uniform over a wafer but also over different wafers. The same hold for other techniques of introducing an etch stop into a wafer in order to create a device layer and a handle layer.

Also, it has been found that if portions of the device layer are incorporated into functional parts of the MEMS device, one may profit from the uniform thickness of the device layer. By the herein discussed approach, this is done by the fabrication of the suspension of a membrane and the membrane itself, i.e. suspension and membrane are made of the device layer and show thicknesses that equal the thickness of the untreated device layer.

In addition, the approach discussed herein makes a straightforward loading of the membrane with an adjustable mass to form an adjusted resonator—the resonator comprises, in addition to the membrane, the adjustable mass that loads the membrane—possible. In particular, the mass loading the membrane comprises remaining parts of the handle layer and etch stop of the first wafer and also has the functionality to enhance the rigidity of the resonator membrane. This is important to avoid unwanted resonance modes of the resonator.

In principle, such a suspension and loaded or unloaded membrane may be used in many applications other than a pressure transducer, e.g. in optical devices, such as modulator and filters, RF communication systems, and inertial sensing devices, such as accelerometers, gyroscopes and their integration to inertial measurement units (IMUs). In particular, a suspension and membrane according to the invention have the same positive effect in terms of reproducibility in all these devices as well. Hence, the invention also generally pertains to a MEMS device manufactured from a wafer comprising said handle layer and device layer, using in particular a fabrication method according to the invention, and comprising a membrane formed by structuring and releasing the device layer, wherein a suspension of the membrane is also formed from the device layer. Optionally, such a device may further comprise a mass loading the membrane, the mass formed by the handle layer (and possibly by further layers) and thereby being adjustable during the manufacturing process. The device may further comprise means to actuate the membrane as well as measure its position.

In an embodiment of the pressure transducer, the structure of the handle layer of the first wafer results from a structuring process carried out on the first wafer after the first wafer was bonded along its structured device layer to the possibly structured top surface of the second wafer. Hence, the handle layer of the first wafer is structured in a bonded state of first and second wafer (i.e. the first wafer is bonded to the second wafer) but it is non-structured in a non-bonded state of first and second wafer.

In addition, the structure of the device layer of the first wafer before said structuring process carried out on the first wafer may comprise the not yet released suspension and potentially further parts of the pressure transducer, such as the membrane and/or the inlet. Hence, the structure of the device layer comprises the suspension and potentially further parts in a non-bonded state of first and second wafer, already.

The pre-processing of both the device layer of the first wafer and the top surface of the second wafer before bonding, allows for the integration of optimized features in the cavity (i.e. between the released resonator element and the fixed device boundary). These features, such as stoppers and a spacer layer on top of the device layer of the first wafer (see below), can be deposited and/or structured on either the first or second wafer.

As mentioned, in an embodiment of the pressure transducer, the membrane is loaded by a mass comprising the handle layer or portions thereof and possibly the etch stop or portions thereof. In particular, the mass comprises the portion of the handle layer that is the extension of the membrane normal to the membrane or parts of this portion of the handle layer. However, the extension of the mass can also include a larger portion of the handle layer, e.g. the extension of the mass is larger than the one of the membrane.

In embodiments with a structured top surface of the second wafer, the structure of the top surface of the second wafer may comprise a recess, in the following called "device recess". This device recess forms the bottom and side walls of the cavity that results from bonding the first wafer along its structured surface to the structured surface of the second wafer. The device recess can be etched into the top surface of the second wafer or it can be fabricated by at least one spacer layer comprising openings of the shape of the device recess.

It is understood, that the device recess or spacer layer can be fabricated in an analog manner on the surface of the device layer of the first wafer as well.

The depth of the device recess especially may correspond to the target distance between membrane and a base, wherein the base corresponds to the bottom of the cavity. However, the depth can be adapted for influences on the recess depth resulting from the bonding process or other process steps, e.g. the fabrication of conductor lines and electrodes (see below). The depth of the device recess is chosen such that a friction/squeeze-film can be established. This means that the depth of the device recess is in the order of a few micrometers depending on the said influences, in particular between 0.5 and 5 µm, especially between 2 and 4 µm.

Other applications than pressure transducers may need different distances between membrane and a base. With the present approach, distances between a few tens of nanometers and hundreds of micrometers can be achieved.

In embodiments, the opening in the structured top surface of the second wafer generated by the device recess may have an area parallel to the top surface that is larger than a corresponding area comprising the membrane and its suspension.

In order to fabricate a cavity in accordance to the functionality of the pressure transducer, i.e. the membrane and its suspension are not in direct contact with the second wafer, the first wafer may be positioned relative to the second wafer before bonding the structured device layer to the structured top surface of the second wafer such that all portions of the suspension and its membrane lie on top of the device recess. This also means that it is the membrane that forms the top of the cavity.

The pressure transducer may further comprise at least one stopper that defines a maximal deflection of the resonator and reduces the risk of damage. The at least one stopper is located within the cavity, for example protruding from the bottom of the cavity and/or from the side of the membrane facing the cavity. The stopper(s) may have the shape of a pin, bump or ridge, for example. In particular, it/they are a portion of the structure of the second wafer or additionally deposited material.

In an embodiment, the pressure transducer comprises at least one electrode, wherein the at least one electrode and the membrane form at least one capacitor for actuating and measuring an amplitude and a frequency of an oscillation of the membrane relative to the bottom of the cavity. In particular, the at least one electrode is arranged at the bottom of the cavity, e.g. in the form of a conductive area, or the second wafer or parts thereof are used as the at least one electrode.

In an embodiment, the pressure transducer comprises a capacitor for measuring the amplitude and frequency of the oscillation of the membrane relative to the bottom of the cavity. Said capacitor is for example formed by the following electrodes:
  the membrane (in particular the surface of the membrane that is directed towards the cavity) and the second wafer. This embodiment of the capacitor comprises a capacitor for measuring the amplitude and frequency of the oscillation of the membrane formed by a portion of the membrane and/or a portion of the second wafer;
  an electrode and the membrane, wherein the electrode is arranged at the bottom of the cavity;
  an electrode and the second wafer or a portion thereof, wherein the electrode is arranged on the membrane; or
  at least two electrodes, wherein at least one electrode is arranged on the membrane and at least one is arranged at the bottom of the cavity.

The capacitor for measuring the amplitude and frequency of the oscillation of the membrane may further be connected to a control loop with which the amplitude and/or frequency of the oscillation of the membrane relative to the bottom of the cavity is measured.

In a further embodiment, the pressure transducer comprises a capacitor for actuating the membrane. Said capacitor is for example formed by the following electrodes the membrane (in particular the surface of the membrane that is directed towards the cavity) and the second wafer. This embodiment of the capacitor comprises a capacitor for actuating the membrane formed by a portion of the membrane and/or a portion of the second wafer;

an electrode and the membrane, wherein the electrode is arranged at the bottom of the cavity;

an electrode and the second wafer or a portion thereof, wherein the electrode is arranged on the membrane; or at least two electrodes, wherein at least one electrode is arranged on the membrane and at least one is arranged at the bottom of the cavity.

The capacitor for actuating the membrane is part of an oscillation generator that is equipped for exciting an oscillation of the membrane by applying an excitation voltage to at least one of the electrodes that form the capacitor. The frequency of the excitation voltage is adapted to the pressure-dependent resonance frequency of an appropriate resonance mode of the possibly loaded membrane. Excitation and resonance frequencies in the range of 0.1 to 1000 kHz, in particular in the range of 1 to 100 kHz, are used, whereby it is the impact of the pressure/squeeze-film that leads to such an extended frequency range.

The electrode(s) can be made of any conductive material that is vacuum compatible, in particular non-outgassing at least up to $10^{-7}$ mbar, and that shows stable and pressure independent properties over a longer period of time. For example, the electrode may be made of doped silicon, Al, Ti, W, Au, Pt, Pd, Cr, Ta, Zr, and alloys thereof.

The pressure transducer can comprise the capacitor for measuring the amplitude and frequency of the oscillation of the membrane relative to the bottom of the cavity, only. The pressure transducer can comprise the capacitor for actuating the membrane, only. However, the pressure transducer can comprise both said capacitors.

In the following, a capacitor for measuring the amplitude and frequency of the oscillation of the membrane is called a "first capacitor" and a capacitor for actuating the membrane is called a "second capacitor", in order to distinguish these two capacitors and the electrodes they comprise in a suitable manner. Accordingly, any electrode of the first capacitor is called an "electrode of the first kind" and any electrode of the second capacitor is called an "electrode of the second kind". This nomenclature is used independently of the concrete embodiment of the pressure transducer, this means it is used for a pressure transducer comprising a first capacitor but no second capacitor, for a pressure transducer comprising a second capacitor but no first capacitor, and for a pressure transducer comprising a first and a second capacitor.

The pressure transducer may comprise at least one electrode of a first kind and at least one electrode of a second kind. For example, an electrode of the first kind and an electrode of the second kind may be arranged on the membrane and share a common electrode which is arranged on the second wafer or which is the second wafer itself.

In order to contact the electrode(s) and/or capacitor(s), the pressure transducer may further comprise conductor lines, contacting pads and wires. The wires are bonded to the first and/or second wafer directly, in particular to their device layer if present, and/or to the contacting pads, wherein the conductor lines connect the contacting pads with the electrodes, such that control- and measurement signals can be transmitted to a circuitry and/or a control unit and/or the control loop and/or the oscillation generator.

A significant difference between the depth of the device recess and the distance between membrane and bottom of the device recess caused by the conductor lines and/or contacting pads can be avoided for example by design, i.e. the thickness of the metallization is accounted for in the gap/device recess definition;

by embedding conductor lines and contacting pads in a second kind of recess processed into the top surface of the second wafer. This second kind of recess is called "metallization recess".

In particular, conductor lines and contacting pads are parts of the structure of the second wafer. The contacting pads can be made accessible within the same etching process used to release the resonator element or by a further treatment of the handle layer of the first wafer, in particular after bonding of the first and second wafer.

In a further embodiment of the pressure transducer, the pressure transducer comprises elements of Integrated Circuit (IC) Technology, in particular elements of CMOS technology. For example, the second wafer may be a CMOS wafer with circuitry for operating the pressure gauge, such as actuation and readout electronics.

In accordance with embodiments of the invention, the pressure transducer in any of the various embodiments may be part of a pressure gauge (sensor system).

The pressure gauge may further comprise at least one of a circuitry equipped to drive and readout the transducer, a mechanical interface to the vacuum system (environment to be measured), an electrical interface, an electrical feedthrough to transfer signals between the part exposed to the environment to be measured (vacuum) to the electrical interface, and a sensor housing. The electrical interface provides a connection capable for data transmission, e.g. used for measurand read-out and control of the pressure transducer, and powering of the pressure gauge. In particular, the electrical interface provides a connection to a control unit.

The mechanical interface may comprises a vacuum flange.

The electrical interface is equipped to connect the pressure transducer, in particular via the electrical feedthrough, to the circuitry.

The characteristics of the oscillating resonator, in particular its resonance frequency and amplitude, are pressure dependent due to the presence of a friction/squeeze-film between resonator and the bottom of the cavity. The lower the pressure, the less is the oscillating membrane damped by the friction/squeeze film. The influence of damping by the friction/squeeze-film can be read-out by using the capacitance signal of a said capacitor as a measurand.

In an embodiment, the circuitry is equipped to drive the resonator by an excitation signal at resonance or close to resonance and at a controlled amplitude, in particular at a constant amplitude. This mode of operation can be achieved by a closed-loop feedback control. Therefore, an embodiment of the pressure gauge working with this mode of operation comprises the circuitry being further equipped to use the excitation signal needed to control the amplitude of the oscillating resonator as a measurand for the pressure.

The circuitry may be connected to the pressure transducer by electrical connection (bond wire, through-Si-via, feedthrough) or directly integrated in the pressure transducer (monolithic integration).

In an embodiment, the pressure gauge further comprises a control unit being equipped with at least one of an automatic or manual routine for gauge calibration, means for manual operation of the pressure gauge, e.g. by the adjustment of operating parameters, and a user interface, in particular a graphical user interface (GUI). The means for manual operation may comprise for example a knob, a touch screen and/or a potentiometer. The user interface may for example be a screen, said touch screen and/or a display.

The present invention provides also a method for the fabrication of a pressure transducer based on a squeeze-film for use in a gas pressure gauge. The method comprises the steps of structuring a first layer of the first wafer, turning the first wafer up side down such that the structured first layer of the first wafer faces the top surface of the second wafer, bonding the first wafer along its structured first layer to the top surface of the second wafer and processing a second layer of the first wafer.

Therein, the first layer of the first wafer is either the device layer or the handle layer and the second layer is the one of device layer and handle layer that is not the first layer.

The structure of the device layer comprises the suspension and the membrane, regardless of the device layer being structured as first or second layer.

The structure of the handle layer is able to release the suspension and membrane, regardless of the handle layer being structured as first or second layer.

The second layer is structured from its still exposed side. In the case of a first wafer being an SOI-wafer, this means for example that the second layer is the handle layer and that the handle layer is structured from the handle layer side of the SOI-wafer (i.e. from the "backside" of the SOI-wafer).

The step of structuring the first and/or second layer may comprise, for example, a deep reactive ion etching process (DRIE or Bosch process).

In an embodiment of the method, the first layer is the device layer and the second layer is the handle layer.

In this embodiment, the first wafer is structured form its device layer side, first. The step of structuring the first wafer from its device layer side comprises the formation of the suspension and the membrane in the device layer, wherein suspension and membrane are not yet released, i.e. they are still supported by the handle layer and potentially by the etch stop. In particular, depth controlled etching as described above with etch stop or without etch stop (e.g. time controlled etching) can be used to establish the needed structures in the device layer of the first wafer.

The structure of the suspension is designed to be capable to hold the portion of the first wafer that comprises the later membrane after its release.

The shape of the membrane is defined by through etching the device layer and potentially the etch stop locally along a closed curved, but excluding the regions that comprise the suspension.

Further in the embodiment with the first layer being the device layer and the second layer being the handle layer, the step of structuring the second layer of the first wafer is carried out from the handle layer side of the first wafer. Said step of structuring comprises etching down the handle layer and potentially the etch stop in a way that the suspension and the membrane are released and the inlet is formed.

A mask with an opening may restrict the etching step to the desired region, i.e. to a region adjacent to the suspension and following the closed curve that defines the shape of the membrane in the device layer, and/or having the shape of the later inlet. For example, the mask opening may be in the shape of an annular ring. In addition, the opening may cover a portion of the wafer containing the membrane. This leads to a membrane loaded by a mass adjustable by mask design.

The method can further comprise one or more steps for the realization of additional features of the pressure transducer, such as a device recess, inlets, at least one metallization recess, stopper, electrode, conductor line, contacting pad and wires on the first and/or second wafer. Such features are processed before bonding of the first and second wafer. The method can further comprise releasing of the contacting pads, bonding of wires onto the contacting pads, fabrication of inlets and an adjustment or removal of the mass possibly loading the membrane after bonding of the first and second wafer. Further, an isolating layer, in particular an oxide layer, can be used to insulate electrodes, conductor lines and/or contacting pads towards the second wafer which happens if the second wafer is not made of an non-conductive material, in particular if it is a Si-wafer.

The fabrication of the device recess may comprise the deposition and structuring of a spacer layer on either the device layer of the first wafer or the top surface of the second wafer for defining the later cavity. However, the device recess may also be formed by etching the device layer of the first wafer or the top surface of the second wafer.

The inlets may be fabricated by through-etching the handle layer and potentially the etch stop of the first wafer from its handle layer side. Alternately or in addition, inlets can be fabricated e.g. by structuring the spacer layer, the device layer and/or the top surface of the second wafer before bonding the first wafer and the second wafer. The results are inlets comprising a longitudinal axis parallel to the top surface of the second wafer and parallel to the device layer of the first wafer, respectively, but perpendicular to the height (gap) of the cavity.

Said method leads to a suspension and membrane with a thickness corresponding to the thickness of the device layer, for example of the device layer of a SOI-wafer, wherein the load on the membrane can easily be adjusted, in particular by adjusting the shape and/or size of the handle layer remaining on top of the membrane. In addition, the distance between membrane and the bottom of the recess can easily be adjusted by adjusting the depth of the device recess.

The fabrication process for such a suspension and membrane is not restricted to the field of pressure transducers.

As mentioned, the surface area of the second wafer comprising the device recess is larger than a surface area of the first wafer comprising the membrane and the suspension. In an embodiment of the method, the method further comprises the step of positioning the first wafer relative to the second wafer such that all portions of the suspension and the membrane are on top of the device recess. Hence, the cavity of the pressure transducer is given by the bottom and side walls of the device recess and the membrane. Further, neither membrane nor suspension is in direct contact to any portion of the second wafer.

Figure 1B:
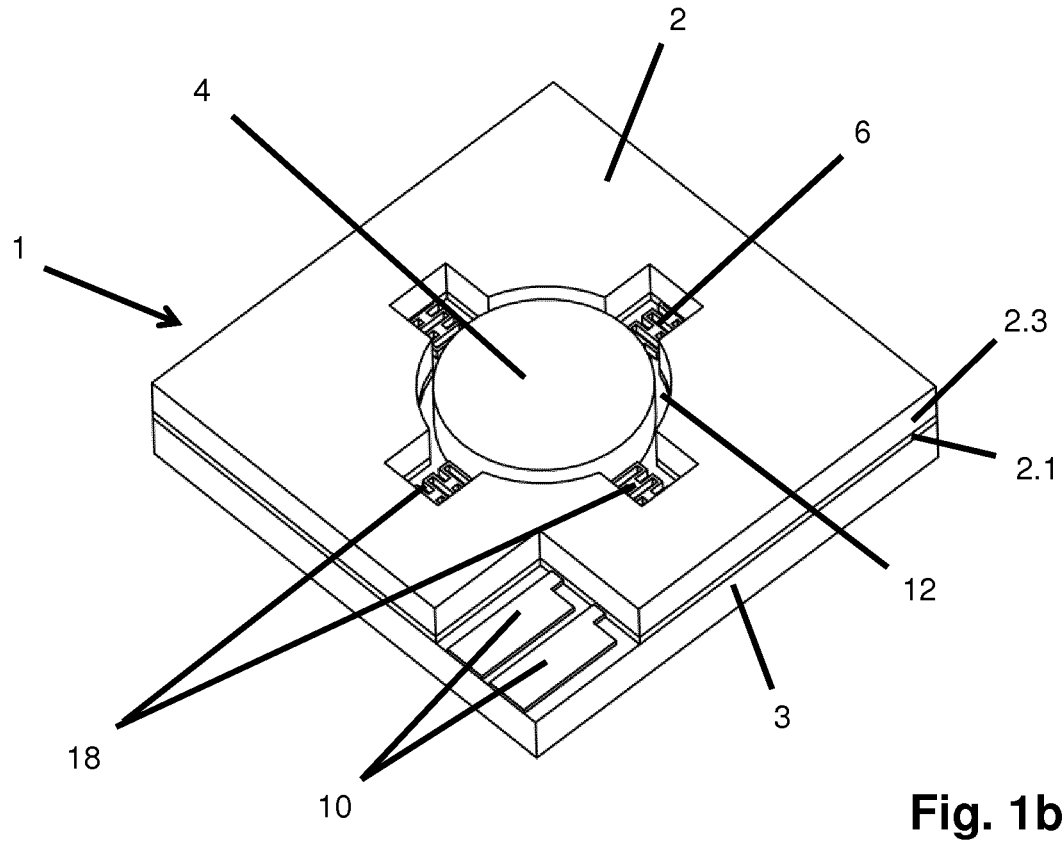
Figure 2:
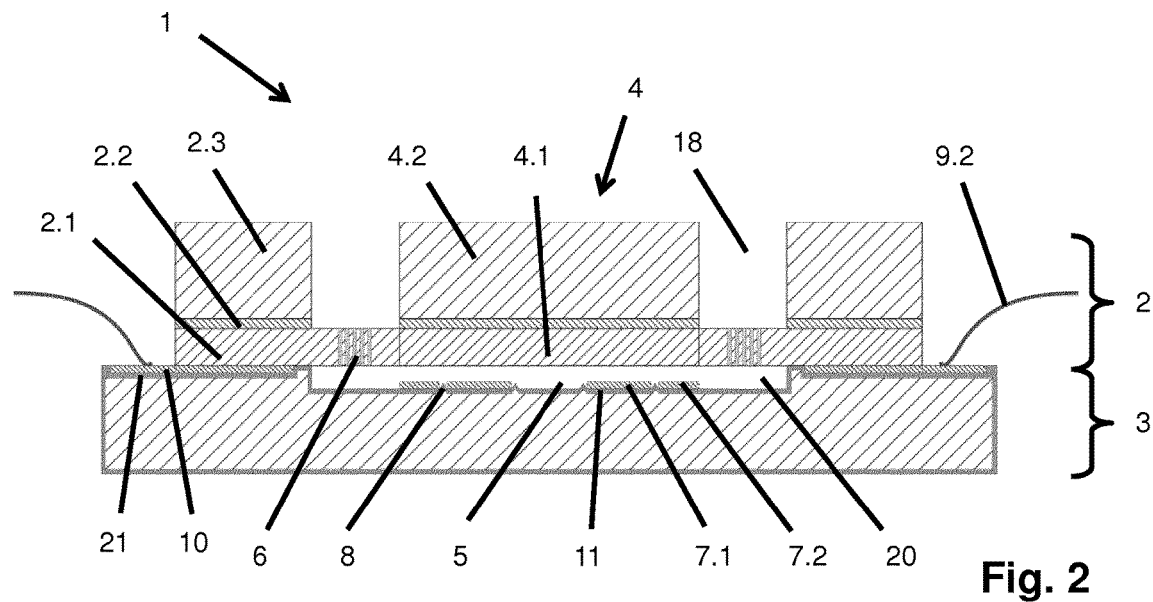
Figure 3:
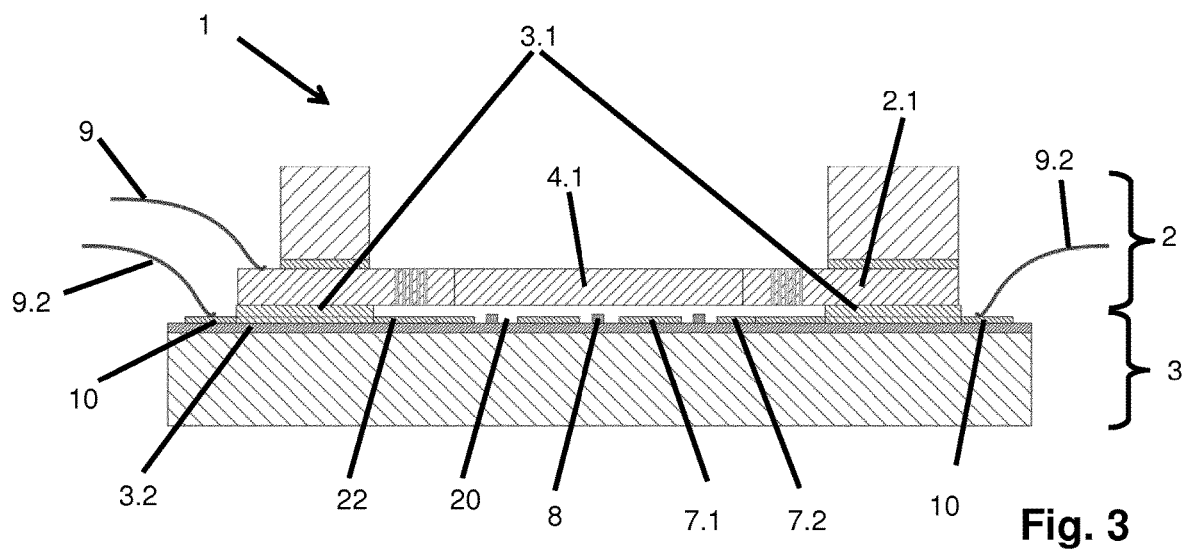
Figure 4:
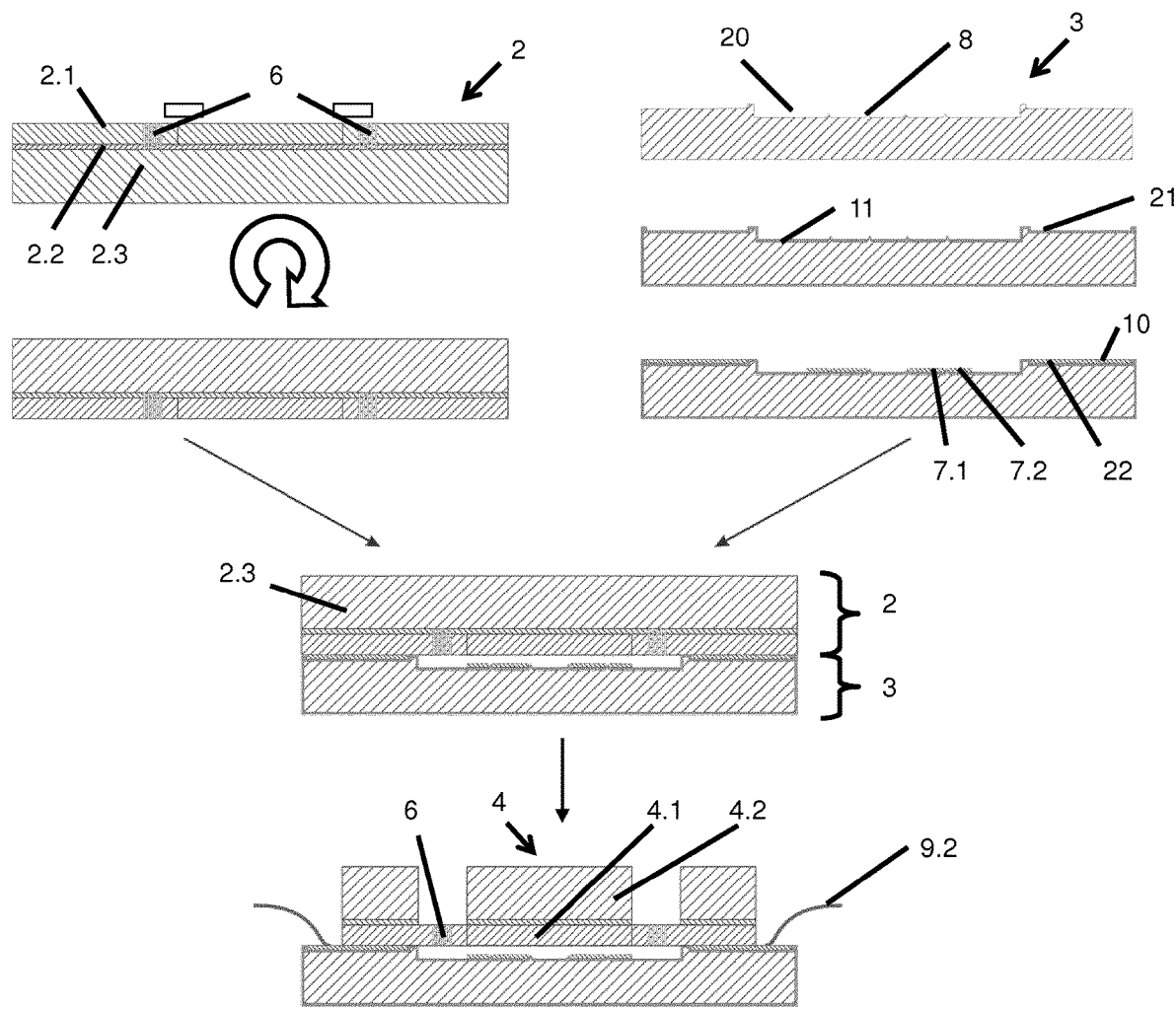
Figure 5:
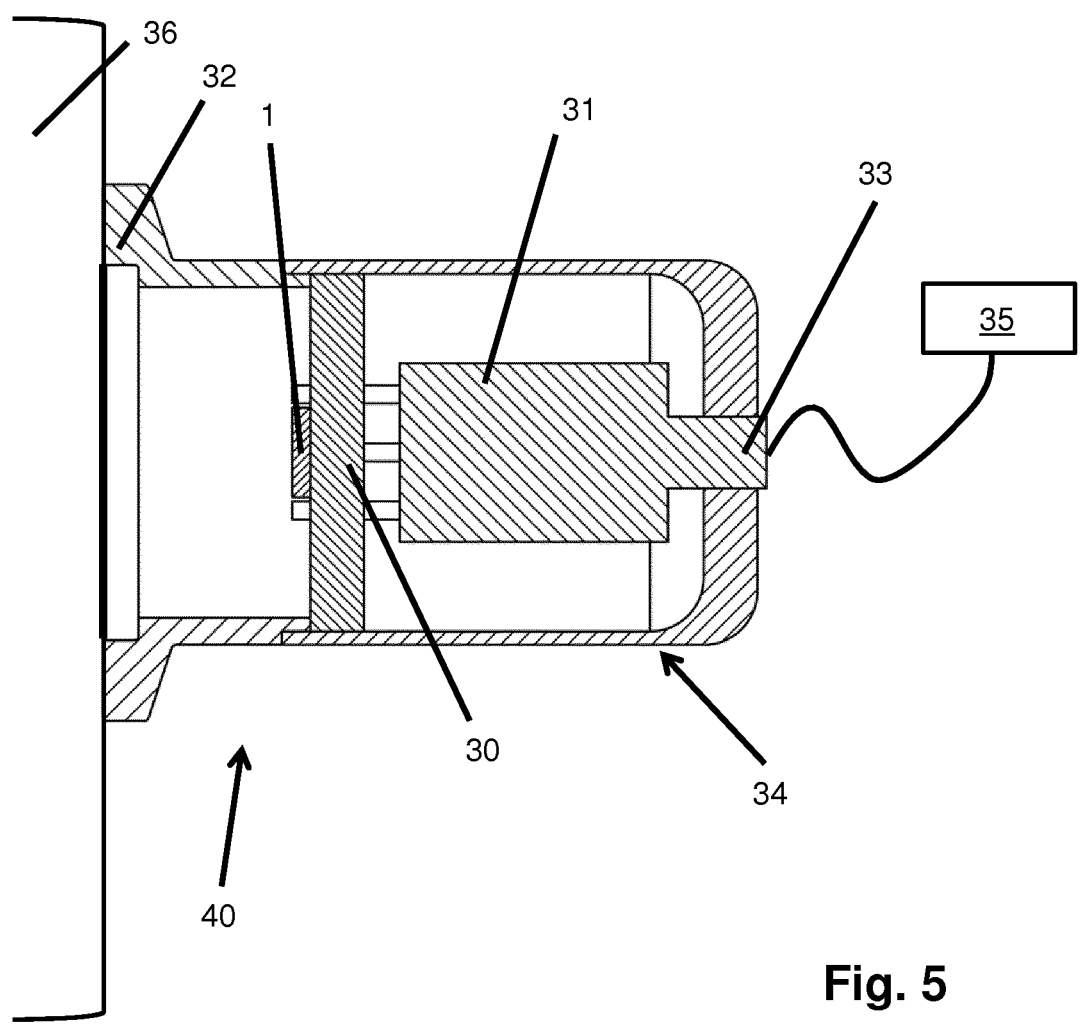

The principle of the invention as well as its applicability will be explained in more detail in the following text with reference to exemplary embodiments, which are illustrated in the attached figures. Identical parts are provided with the same reference symbols in all figures. The figures show:

FIG. 1a A picture of an embodiment of a pressure transducer after packaging;

FIG. 1b A schematic of the embodiment of the pressure transducer showing some features in more detail;

FIG. 2 A schematic cross-section of an embodiment of the pressure transducer;

FIG. 3 A schematic cross-section of an embodiment of the pressure transducer, wherein first and second wafers are SOI wafers and the membrane features no mass loading;

FIG. 4 A visualization of the process flow used for fabricating the embodiment of the pressure transducer shown in FIG. 2;

FIG. 5 A schematic cross-section of a pressure gauge, including the pressure transducer, an electrical feedthrough, a circuitry, a mechanical interface to the vacuum system, an electrical interface and a sensor housing;

FIG. 1a shows a picture of a pressure gauge 40 comprising a pressure transducer 1, a package 13, a first (top) wafer 2 and a second (bottom) wafer 3. FIG. 1b shows features thereof in more detail. Parts of the second wafer 3, which is a Si-wafer in the shown embodiment, lay open in order to allow contacting of contacting pads 10. In the shown embodiment, wires 9 are bonded to the contacting pads 10 on one side and on pins 14 integrated into the package 13 on the other side.

The figures further show the first wafer 2, which is in the shown embodiment an SOI-wafer comprising a device layer 2.1, a handle layer 2.3 and an etch stop 2.2 in the form of a buried oxide layer. The first wafer 2 comprises a resonator 4, a cavity inlet 12 as well as openings 18 that result from the release of a suspension 6. The suspension 6 is made of the device layer 2.1. It can be seen in FIG. 1b below the openings 18 of the handle layer 2.3. Other than the openings 18 of the suspension 6, the cavity inlet 12 reach through handle layer 2.3, oxide layer 2.2 and device layer 2.1 leading to a direct connection between the ambient of the pressure transducer and a cavity 5 (not visible in FIG. 1) located in an area under the resonator 4 and its suspension 6.

FIG. 2 is a schematic cross-sectional view of an embodiment of a pressure transducer 1. It shows the first wafer 2 bonded along its structured device layer 2.1 to the structured top surface of the second wafer 3.

The situation after processing the first wafer 2 from its handle layer side is shown, wherein the first wafer 2 is structured such that it comprises the suspension 6, the opening 18 resulting from the release of the suspension 6, the cavity inlet 12 (not shown) and the resonator 4 that comprises a membrane 4.1 that is loaded by a mass 4.2. Membrane 4.1 and suspension 6 are formed by the device layer 2.1, wherein their thickness is almost equal to the original thickness of the device layer 2.1. In the shown embodiment, the mass 4.2 comprises the handle layer 2.3 and etch stop 2.2 (buried oxide layer) directly above the membrane 4.1 in their full thicknesses.

The second wafer 3 is structured such that it comprises a device recess 20 which forms the bottom and side walls of the cavity 5, and metallization recesses 21. Electrodes of two kinds are embedded in the bottom of the device recess 20. Electrodes of a second kind 7.2 are part of an oscillation generator and serve to actuate the membrane 4.1. Electrodes of a first kind 7.1 constitute one electrode of a capacitor for measuring an amplitude and a frequency of an oscillation of the membrane 4.1. The other electrode of the capacitor is given by the membrane 4.1. The contacting pads 10 are embedded into the metallization recesses 21. Not shown are conductor lines 22 that allow addressing the electrodes via the contacting pads 10.

In the embodiment shown in FIG. 2, the second wafer 3 is a Si-wafer where a thermal oxide 11 was grown after etching of device recess 20 and metallization recesses 21 in order to isolate the different conductor lines 22, electrodes 7.1/7.2 and contacting pads 10 from each other and the base substrate.

First and second wafer are bonded together such that all portions of the membrane 4.1 and all portions of the suspension 6 are positioned above the device recess 20.

FIG. 3 shows a schematic cross-sectional view of a further embodiment of a pressure transducer 1. This embodiment differs from the embodiment shown in FIG. 2 in that there is no mass 4.2 loading the membrane 4.1, in that the membrane 4.1 is contacted by wire 9 directly and in that the second wafer 3 is a SOI wafer.

Hence, the second wafer 3 comprises a device layer 3.1 and a buried oxide layer 3.2, too.

The use of a SOI-wafer as second wafer 3 allows setting of the distance between membrane 4.1 and bottom of the device recess 20 by structuring the device layer 3.1 of the second wafer 3.

Yet two further embodiments of the pressure transducer can be shown by this figure:

the pressure transducer based on an a first additive structuring processes of the second wafer 3, wherein a spacer layer and a dielectric isolation layer is used instead of the device layer 3.1 and the buried oxide layer 3.2 of the second wafer 3, respectively. The spacer layer is deposited and structured on top of a dielectric isolation layer;

The pressure transducer based on a second additive structuring process, wherein a spacer layer is used instead of the device layer 3.1 of the second wafer 3. The spacer layer 3.1 is deposited and structured on top of the device layer 2.1 of the first wafer 2 and bonded to the possibly unstructured surface of the second wafer 3.

In the embodiment shown in FIG. 3, the membrane 4.1 is contacted via a wire 9 that is bounded on the device layer 2.1 of the first wafer 2 directly. Wires 9.2 bonded on contacting pads 10 on the structured top surface of the second wafer 3 serve for contacting the electrodes of the first kind 7.1 and the electrodes of the second kind 7.2. Therein, the buried oxide layer 3.2 of the second wafer 3 is used to insulate different electrodes 7.1/7.2, conductor lines 22 and/or contacting pads 10 arranged on the top surface of the second wafer 3.

FIG. 3 further shows stoppers 8 in the form of micro-tips that define a maximal deflection of the membrane 4.1.

FIG. 4 visualizes the process flow used for fabricating both the pressure transducer 1 and the membrane 4.1 and its suspension 6. First, a 2-3 μm deep device recess 20 is etched into the top surface of the second wafer 3. One or more stopper 8, e.g. in the form of micro-tips, can be realized by etching parts of the device recess less than the rest of the later device recess 20 or by locally depositing bumps. Second, the metallization recesses 21 with a depth of around 300 nm are etched into the second wafer 3 and the resulting surface of the second wafer, which is in the shown embodiment a Si-wafer, is made non-conductive by growing a thermal oxide 11 or deposition of a dielectric layer (e.g. silicon oxide or silicon nitride). Finally, a complete metallization is deposited and structured, leading to electrodes of the first kind 7.1, electrodes of the second kind 7.2, contacting pads 10, and conductor lines 22. Thanks to the fact that the depth of recesses and the height of layers can be controlled in the nm-range, it is possible that the contacting pads 10 and conductor lines 22 are about as thick as the depth of the metallization recesses 21.

Concerning the first wafer 2, the suspension 6 and the sidewalls of the inlet 12 are etched into and through the device layer 2.1 of the first wafer 2 which is in the shown embodiment a SOI-wafer. However, the suspension is still supported by the handle layer 2.3. In the shown embodiment the etch stop (which is the buried oxide layer) 2.2 is also etched with the same geometry defining the membrane 4.1, suspension 6 and inlet 12.

In a next step, the first wafer 2 is flipped, i.e. the device layer 2.1 is facing towards the structured top surface of the second wafer 3, and positioned over the second wafer 3 such that all portions of the suspension 6 and the area of the later membrane 4.1 are located above the device recess 20.

The first wafer 2 is then bonded in this position to the second wafer 3. This also leads to a handle layer 2.3 of the first wafer 2 that lies open for further processing.

In a next step, an annular ring is etched from the handle layer side into the handle layer 2.3 and the etch stop (buried oxide layer) 2.2. The etching goes down to the device layer 2.1 and hence releases the suspension 6 and finishes the inlet 12, leading also to a membrane 4.1 loaded by the handle layer 2.3 on top of it (which forms the mass 4.2 together with the corresponding portion of the etch stop/buried oxide layer 2.2) and held by the suspension 6 only.

Finally, the bonded wafers are singulated into chips, the chips packaged and wires are bonded to the contacting pads 10.

FIG. 5 shows a schematic cross-section of a pressure gauge 40. The main components of the pressure gauge 40 are the pressure transducer 1, a circuitry 31 to drive and readout the transducer signal, a mechanical interface 32 to the vacuum system 36 (environment to be measured), an electrical feedthrough 30 to transfer signals between the part exposed to the environment to be measured (vacuum) to the circuitry 31 and further to an electrical interface 33, and a sensor housing 34.

The electrical interface 33 provides a connection capable for data transmission, e.g. used for measurand read-out and control of the pressure transducer, and powering of the pressure gauge. In particular, the electrical interface 33 provides a connection to a control unit 35 which may comprise at least one of a user interface, means for gauge calibration, and manual operation of the gauge, for example.

LIST OF SYMBOLS

1 pressure transducer
2 first wafer (SOI-wafer)
2.1 device layer
2.2 etch stop (buried oxide layer)
2.3 handle layer
3 second wafer
3.1 spacer layer/device layer of the second wafer
3.2 dielectric isolation layer/buried oxide layer of the second wafer
4 resonator (element)
4.1 membrane
4.2 mass
5 cavity
6 suspension
7.1 electrode of the first kind (sensing)
7.2 electrode of the second kind (excitation)
8 micro-tip/stopper
9 wire (to membrane)
9.2 wire (to electrodes)
10 contacting pad (conductive)
11 thermal oxide
12 inlet (to cavity)
13 package
14 pins
18 opening (suspension)
20 device recess
21 metallization recess
22 conductor line
30 feedthrough
31 circuitry
32 mechanical interface (vacuum flange connection)
33 electrical interface (plug/cable industry standard)
34 sensor housing
36 control unit
36 vacuum system
40 pressure gauge

The invention claimed is:

1. A pressure transducer based on a squeeze-film for use in a gas pressure gauge, the pressure transducer comprising:
 a first wafer and a second wafer, at least the first wafer comprising a device layer and a handle layer, at least the device layer of the first wafer being structured, the second wafer comprising a top surface and a bottom surface;
 a membrane;
 a suspension of the membrane, the suspension allowing oscillation of the membrane;
 a cavity with a cavity bottom, the cavity being formed between the membrane and a portion of the second wafer;
 an inlet connecting the cavity to a surrounding; and
 an oscillation generator configured to set the membrane in oscillation,
 wherein the structured device layer of the first wafer comprises the membrane and the suspension of the membrane,
 wherein the first wafer is bonded to the top surface of the second wafer,
 wherein the handle layer of the first wafer comprises a structure configured to release the suspension.

2. The pressure transducer of claim 1, wherein the first wafer is bonded to the top surface of the second wafer along the structured device layer of the first wafer.

3. The pressure transducer of claim 1, wherein the first wafer is processible by depth controlled etching, wherein an etching depth of the depth controlled etching corresponds to a thickness of the device layer of the first wafer.

4. The pressure transducer of claim 1, wherein the first wafer comprises an etch stop that forms a boundary between the device layer and the handle layer.

5. The pressure transducer of claim 4, wherein the first wafer is an SOI wafer.

6. The pressure transducer of claim 1, wherein the top surface of the second wafer is structured.

7. The pressure transducer of claim 1, wherein the handle layer of the first wafer is structured due to a structuring process carried out on the first wafer when bonded to the second wafer.

8. The pressure transducer of claim 7, wherein the structure of the device layer of the first wafer before the structuring process of the handle layer carried out on the first wafer when bonded to the second wafer comprises the not yet released suspension.

9. The pressure transducer of claim 1, wherein the membrane is loaded by a mass comprising the handle layer of the first wafer or portions thereof.

10. The pressure transducer of claim 9, wherein the mass comprises a portion of the handle layer that is an extension of the membrane normal to the membrane or parts of the portion of the handle layer.

11. The pressure transducer of claim 1, wherein the top surface of the second wafer is structured such that the second wafer comprises a device recess that forms the bottom and side walls of the cavity.

12. The pressure transducer of claim 1, wherein the cavity comprises a stopper defining a maximal deflection of the membrane.

13. The pressure transducer of claim 1, further comprising a capacitor for measuring an amplitude and a frequency of an oscillation of the membrane relative to the bottom of the cavity, wherein the capacitor is formed by:
- the membrane and the second wafer;
- an electrode of a first kind and the membrane, wherein the electrode of the first kind is arranged at the bottom of the cavity;
- the electrode of the first kind and the second wafer or a portion thereof, wherein the electrode of the first kind is arranged on the membrane; or
- at least two electrodes of the first kind, wherein at least one electrode of the first kind is arranged on the membrane and at least one other electrode of the first kind is arranged at the bottom of the cavity.

14. The pressure transducer of claim 1, further comprising a capacitor for actuating the membrane, wherein the capacitor is formed by:
- the membrane and the second wafer;
- an electrode of a second kind and the membrane, wherein the electrode of the second kind is arranged at the bottom of the cavity;
- the electrode of the second kind and the second wafer or a portion thereof, wherein the electrode of the second kind is arranged on the membrane; or
- at least two electrodes of the second kind, wherein at least one electrode of the second kind is arranged on the membrane and at least one other electrode of the second kind is arranged at the bottom of the cavity.

15. The pressure transducer of claim 1, further comprising at least one electrode, wherein the at least one electrode and the membrane form at least one capacitor for actuating and measuring an amplitude and a frequency of an oscillation of the membrane relative to the bottom of the cavity.

16. A pressure gauge for measuring gas pressure, the pressure gauge comprising the pressure transducer of claim 1.

17. The pressure gauge of claim 16, further comprising:
- circuitry configured to drive and readout the pressure transducer;
- a mechanical interface to a vacuum system;
- an electrical interface;
- an electrical feedthrough configured to transfer signals between the part exposed to the environment to be measured to the electrical interface; and/or
- a sensor housing.

18. The pressure gauge of claim 16, further comprising a control unit configured for pressure gauge calibration, manual operation of the pressure gauge and/or user interaction.

19. A method for fabricating a pressure transducer based on a squeeze-film for use in a gas pressure gauge, the pressure transducer comprising a first wafer and a second wafer, wherein at least the first wafer comprises a device layer and a handle layer, and wherein the second wafer comprises a top surface and a bottom surface, the pressure transducer further comprising a membrane, a cavity between the membrane and a portion of the second wafer, wherein the cavity has a cavity bottom, an inlet connecting the cavity to a surrounding, a suspension of the membrane, wherein the suspension allows oscillation of the membrane, and an oscillation generator configured to set the membrane in oscillation, the method comprising:
- structuring a first layer of the first wafer, wherein the first layer is either the device layer or the handle layer;
- flipping the first wafer such that the structured first layer faces the top surface of the second wafer;
- bonding the structured first layer to the top surface of the second wafer; and
- structuring a second layer of the first wafer, the second layer being the other one of the device layer and the handle layer that is not the first layer, from an exposed side of the second layer,
- wherein a structure of the device layer comprises the suspension and the membrane,
- wherein a structure of the handle layer is configured to release the suspension and membrane.

20. The method of claim 19, wherein the first layer is the device layer and the second layer is the handle layer.

21. The method of claim 19, further comprising:
- fabricating a device recess at the top surface of the second wafer or at the device layer of the first wafer;
- fabricating inlets;
- etching a metallization recess into the top surface of the second wafer;
- fabricating at least one stopper which defines a maximum deflection of the membrane;
- oxidizing the top or bottom surface of the second wafer;
- depositing a metallization layer forming electrodes, conductor lines and/or contacting pads;
- reducing a mass that comprises the handle layer of the first wafer and that loads the membrane, by etching locally the handle layer;
- uncovering the contacting pads by etching the first wafer from a handle-layer side of the first wafer; and/or
- bonding wires configured to transmit control and measuring signals.

* * * * *